Dec. 30, 1941.  E. M. GREEN  2,267,728

LUBRICATOR

Filed Feb. 13, 1939  2 Sheets—Sheet 1

Inventor.
Emmet M. Green.
H. Calvin White
Attorney.

Dec. 30, 1941. E. M. GREEN 2,267,728
LUBRICATOR
Filed Feb. 13, 1939 2 Sheets-Sheet 2

Inventor:
Emmet M. Green.
H. Calvin White
Attorney.

Patented Dec. 30, 1941

2,267,728

UNITED STATES PATENT OFFICE 2,267,728

LUBRICATOR

Emmet M. Green, Los Angeles, Calif.

Application February 13, 1939, Serial No. 256,146

23 Claims. (Cl. 123—196)

This invention has to do generally with improvements in lubricating devices, and relates particularly to lubricators of the type adapted to supply lubricant to the valves and cylinders of internal combustion engines. The desirability and advantages of supplying lubricant to the intake manifold or head chambers of an engine, especially when the engine is being started cold, are generally known and need not be discussed in detail beyond referring to the fact that introduction of lubricant in this manner serves effectively to give an initial lubrication that reduces wear on the piston and valve parts, decreases crank case oil consumption, and also reduces carbon deposition within the head and cylinder walls of the engine.

The general idea of drawing lubricant, or a lubricant and air mixture, into the combustion chambers of an engine in some predetermined relation to the manifold depression, is known in the art. Suffice to state concerning prior lubricators that they function in this manner and operate continuously to deliver lubricant while the engine is running. As I view the essential purpose of a lubricator of this type, it is only necessary that it function as such while the cold engine is being started, and then only for a comparatively short period of time until the engine has become sufficiently warmed to operate normally. Accordingly, one of my primary objects is to provide an improved lubricator which will respond to starting of the engine and instantly deliver lubricant thereto in proper quantity, but which thereafter will continue to supply lubricant only for a period required to thoroughly oil the parts while the engine is warming up to a point when such starting lubrication no longer is required. In this connection the invention is particularly characterized by the provision of an extremely simplified but effective method of discontinuing lubricant feed to the engine after the starting period, this method involving an air cut off and obviating the necessity for valves or other moving mechanical parts.

In consonance with belief stated above with respect to the requirements of starting lubrication, it is also regarded as unnecessary to supply lubricant to the manifold or head each time the engine is started after having been warmed up to temperatures above the usual starting temperature. Accordingly, I have incorporated in the present lubricator a timing feature whereby after the engine has become started and warmed, a successive charge of lubricant is made available only after the engine has been stopped for a substantial and preferably predetermined period of time. Typically, I may accomplish this object by feeding lubricant to the engine from a chamber which in turn is supplied with lubricant only when the engine is stopped. Then, by timing the rate of lubricant feed to the chamber, I am able to control the availability to the engine of successive charges so that only after the engine has stopped and cooled sufficiently to require head lubrication, will the device supply the lubricant.

The invention embodies a number of additional characteristics and objects, but these as well as the features referred to in the foregoing will be understood to better advantage without necessity for further preliminary discussion, from the following description of the invention as represented by a typical and illustrative form. Throughout the description reference is had to the accompanying drawings, in which.

Figures 1, 2, 3:
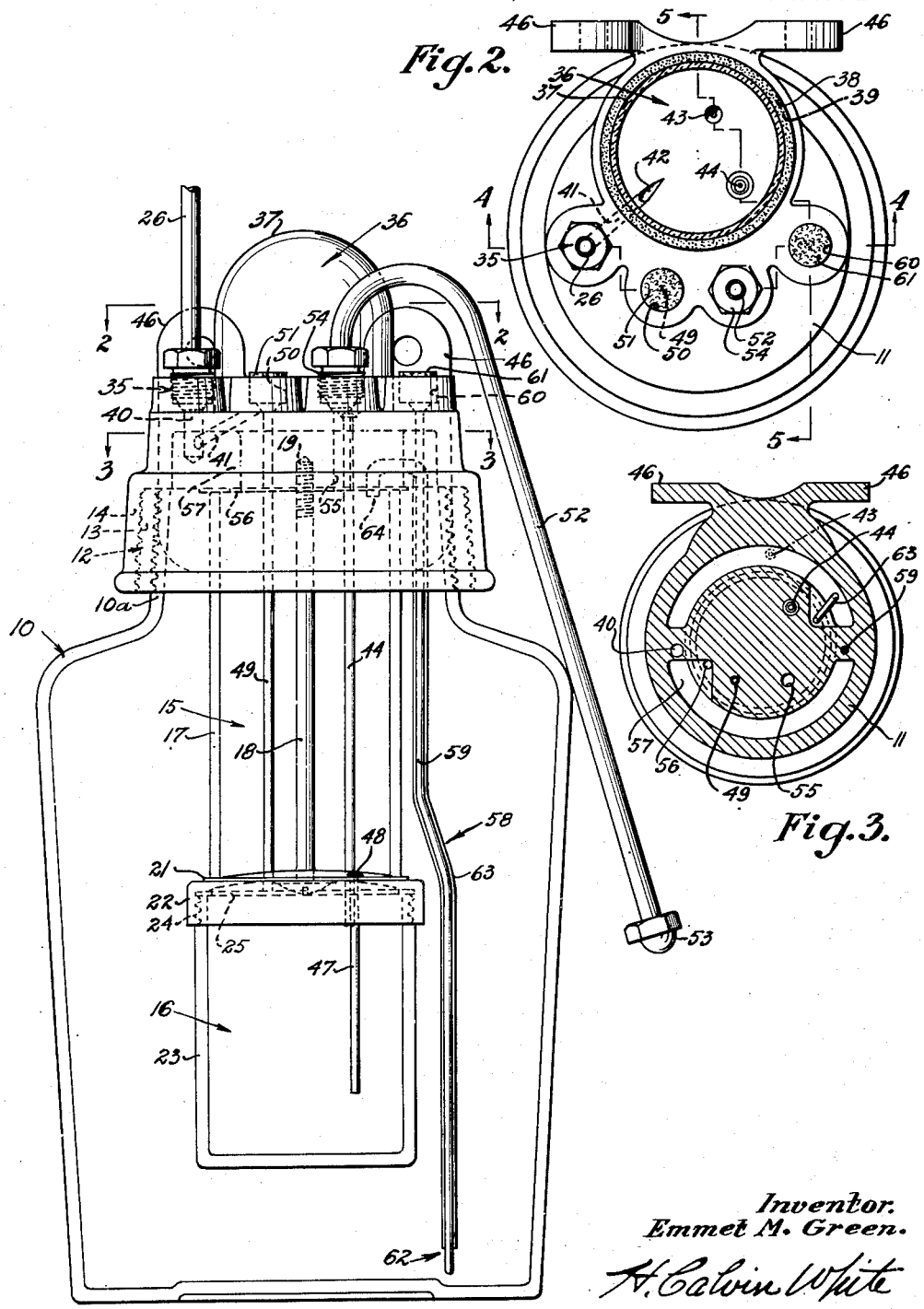
Fig. 1 is a front elevation of the lubricator.
Fig. 2 is a plan section taken on line 2—2 of Fig. 1.
Fig. 3 is a reduced scale section on line 3—3 of Fig. 1.

Referring first to Fig. 1, the lubricator comprises a container 10 serving as a lubricant reservoir, the container being made of any suitable material, though preferably of glass in order that the flow and condition of lubricant within the inner chambers may at all times be observed. The top of container 10 is closed by a cap 11 secured to the container by a joint 12 that is made air tight by placing a suitable sealing compound 13 in the annular space between skirt 14 of the cap and the neck 10a of the container. Sealed within the container is a pair of chambers 15 and 16 preferably glass-walled, arranged one above the other as illustrated. It will be understood that in the broad aspects of the invention the lubricant reservoir may have any suitable arrangement with reference to chambers 15 and 16, although in the typical form illustrated, the reservoir is shown to contain the inner chambers in one compact assembly. The cap 11 may be cast with a pair of integral drilled lugs 46 by means of which the lubricator may be mounted on an automobile body wall at the rear of the engine, or on any other suitable support.

Chamber 15 may be referred to as the feed chamber and is formed by a cylindric glass tube 17 clamped by bolt 18, threaded at 19 into the cap 11, between gaskets 20 and 21 applied to the cap and the lower chamber closure 22 respectively. Chamber 16, which may be termed the lubricant supply chamber, is formed by a glass receptacle 23 threaded at 24 into the closure 22, the top of the receptacle being tightened against gasket 25 to provide an air tight joint with the closure. Thus, both chambers 15 and 16 are attached to and suspended from the cap 11, so that these parts may be inserted in and withdrawn from the container 10 as a unit.

Figures 4, 5, 6, 7, 8:
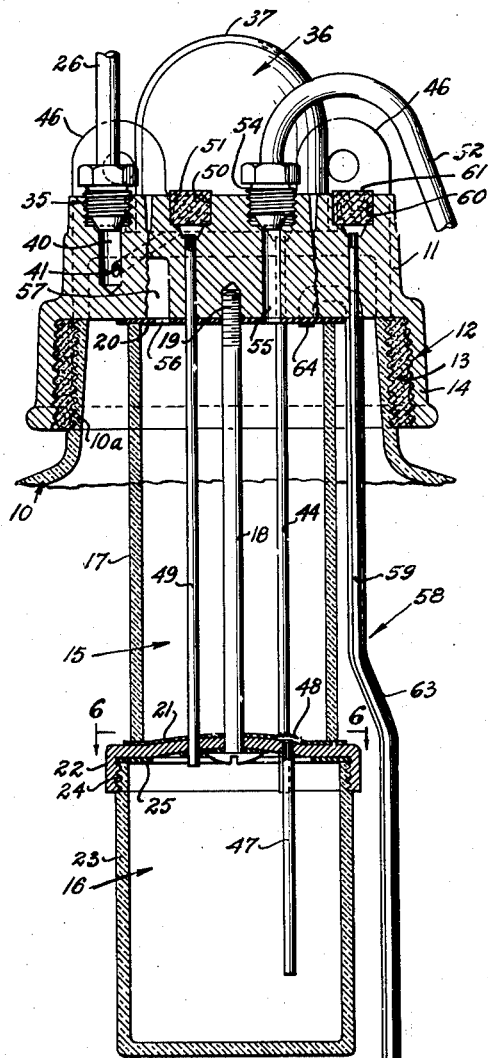
Fig. 4 is a fragmentary vertical section on line 4—4 of Fig. 2, showing more in detail the mounting and arrangement of the lubricant feed and supply chambers.
Fig. 5 is a section on broken line 5—5 of Fig. 2.
Fig. 6 is a plan section on line 6—6 of Fig. 4.
Fig. 7 is a section showing an improved form of connection between the lubricator discharge line and the engine intake manifold.
Fig. 8 is a section on line 8—8 of Fig. 7.

The lubricator is adapted to be connected with the engine at any suitable point in the intake manifold, at or beyond the carbureter, so that during engine operation, the manifold depression is communicated to the lubricator. The connection between the lubricator and engine comprises a pipe 26 which may be connected into the engine suction passage in any suitable manner, although the particular form of attachment indicated generally at 27 in Figs. 7 and 8, has been found to be especially advantageous by reason of its simplicity and adaptability to practically all installations. The particular advantage of this type of connection is that it permits attachment of the lubricant discharge line at any gasketed joint between the manifold and engine or carbureter, without the requirement for special parts or fittings, or in fact any extra parts. As shown in Figs. 7 and 8, simply by flattening the end portion of pipe 26 and inserting the end between the usual gaskets 28 and 29 and within transverse registering grooves 30 and 31 formed in the gaskets, a gas tight joint about the flattened end of the tube is formed when the parts 32 and 33 are bolted together to compress the gaskets. These parts 32 and 33 may, for example, be sections of the manifold or the joint parts at the connection between the manifold and carbureter. By outwardly flaring the inner end of pipe 26 as indicated at 34, the pipe is effectively prevented from becoming pulled out of the joint.

As best illustrated in Fig. 4, pipe 26 connects at 35 with an outlet passage through which suction is communicated to an enlarged chamber 36 formed by a glass dome 37 seated within a cavity 38 in the cap 11 and sealed by a suitable compound 39 poured into the annular recess surrounding the base of the dome, see Fig. 2. Suction is communicated from pipe 26 to chamber 36 through a passage formed by vertical bore 40 and a diagonally intersecting bore 41 opening at 42 into the bottom of the chamber. Suction is communicated from chamber 36 to the interior of container 10 through a calibrated orifice 43, see Fig. 5, and to the supply chamber 16 by way of a tube 44 extending vertically through the cap 11, chamber 15, and closure 22, the lower end of the tube depending within chamber 16 a predetermined distance below its top closure. Tube 44 may be given sufficiently tight fit within the cap 11 and closure 22, to form fluid tight joints therewith. Preferably, the bore size of tube 44 at its lower end is reduced to form a restricted orifice at 45 of predetermined size, as will later appear.

Chamber 15 communicates with the lower chamber 16 through a tube 47 of restricted and predetermined size, the tube extending through the closure 22 below screen 48 and depending within chamber 16 a predetermined distance below the lower end of tube 44. The supply chamber 16 is vented to the atmosphere by way of tube 49 extending vertically through closure 22, chamber 15 and cap 11 into an enlarged bore 50, the latter containing a suitable filtering material 51 to prevent restriction of the tube by dust particles. The lubricant supply in the reservoir may be replenished, as will later appear, through a pipe 52 normally closed by a suitable fitting 53 (see Fig. 1) and connecting at 54 with a bore 55 extending through the cap 11 to the upper end of chamber 15. The latter is in open communication at its upper end with the interior of the reservoir through opening 56 (Fig. 4) and the space or recess 57 within the under side of the cap.

Lubricant is supplied from the container 10 to the feed chamber 15 during operation of the engine, by means of an injector pump generally indicated at 58. The latter comprises a relatively small diameter tube 59 extending through the cap 11 from bore 60 containing foraminous air filtering material 61. The lower portion of tube 59 extends below the oil level within the reservoir and turns upwardly at 62 into the lower end of a larger diameter tube 63, the upper end of which discharges at 64 into the top of chamber 15. Directly above the discharge end 65 of tube 59, tube 63 is provided with apertures 66 through which oil is drawn from the reservoir by the air stream being projected from tube 59, and elevated within tube 63 to the feed chamber.

In considering the operation of the lubricator, it may be assumed that the engine is being started cold and that chamber 15 is completely filled with oil, and the oil stands in chamber 16 at a level somewhat below the top thereof. Immediately upon the starting of the engine, the suction communicated to chamber 36 acts to draw lubricant from chamber 16 upwardly through tube 44. Upon entering chamber 36 the oil spreads over the bottom of the chamber and is intimately admixed with a high velocity stream of air being drawn into the chamber through orifice 43. As a result, the oil is subjected to rather violent aeration and is converted to a substantially froth-like consistency filming the chamber dome 37. The aerated lubricant thence is drawn through passages 41, 40, and pipe 26 into the air stream flowing to the engine through the manifold. Withdrawal of lubricant from the chamber 16 continues, however, for only a relatively short predetermined time (assuming a given manifold depression), and only a predetermined portion of the total lubricant contained in chamber 16 is taken to the engine. The quantity of lubricant thus supplied is determined by the distance tube 44 is projected downwardly into the supply chamber, and of course may be varied as desired. As will be apparent, suction communicated to tube 44 acts to withdraw lubricant from chamber 16 until the oil level drops to or just below the lower end 45 of the tube. At this point further delivery of lubricant is cut off due to the depressed oil level and the admission of air to tube 44 taken into chamber 16 through tube 49. Thereafter, no further lubricant is fed to the engine while it remains in operation, the initial charge of lubricant supplied as described, being sufficient to afford the necessary lubrication during the warming-up period.

During continuing operation of the engine, lubricant is displaced from chamber 16 upwardly through tube 47 into chamber 15 by reason of the depression communicated from chamber 36 through orifice 43 to the container 10 and thence through opening 56 to the top of chamber 15. The pressure differential thus acting to displace lubricant from the supply chamber is that corresponding to the difference between the pressure in the container 10 and the pressure in the space above the liquid level in chamber 16, which space, as above stated, is vented to the atmosphere through tube 49. Upward displacement of lubricant through tube 47 into chamber 15 continues until the oil level in chamber 16 drops just below the lower end of tube 47, at which time air is drawn upwardly through the tube to prevent return flow of oil therethrough while the engine is in operation. The displacement of oil into chamber 15 substantially fills the latter and causes any excess to spill over through opening 56 into the container 10. As a result of this last described operation, there is displaced from chamber 16 a predetermined quantity of lubricant (depending upon the position of the lower end of tube 47) which must be returned to the supply chamber before the oil becomes available as a full successive lubricant charge to the engine.

After the engine has stopped, and only at such time, the oil starts to drain back from chamber 15 through tube 47 into the supply chamber. Tube 47, however, is restricted, the bore size being calibrated so that for an oil of given viscosity under pressure corresponding to the oil head within chamber 15, the oil will refill chamber 16 to the lower end of tube 44, or completely fill the chamber to its top, only after a predetermined and extended period of time. This time interval may be in the order of one hour to one hour and a half after the engine has stopped, and during which time the engine may have cooled to a temperature at which lubrication is needed when again started. If the engine is started before expiration of this time period, oil will not be supplied to it by the lubricator since the engine will have remained sufficiently warm and lubricated from its preceding operation, as not to require fresh lubrication when started. Thus, functioning together through their connections, chambers 15 and 16 serve as a timing means whereby without necessity for valves or other moving parts, the starting lubricant charge is automatically measured and fed to the engine over a predetermined relatively short time, and successive charges are made available to the engine only after predetermined periods following each stopping of the engine.

During operation of the engine, oil is continuously fed to the chamber 15 from the reservoir supply in container 10 by the injector pump 58, air being drawn through tubes 59 and 63 of the latter by reason of the depression applied to the outlet end 64, and the relatively high velocity air stream projected from the orifice 65 acting to draw in lubricant through opening 66 and to elevate the oil into the feed chamber. The oil supply in the lubricator may be replenished simply by removing fitting 53 from tube 52 and immersing the latter in a body of oil, the depression applied through passage 55 to the tube while the engine is running, acting to draw the oil into chamber 15, from which the oil overflows through opening 56 into the reservoir.

As illustrative of certain of the various orifice sizes that have been found to give satisfactory performance, orifice 43 may have a minimum diameter of 0.040 inch, the orifice 45 at the lower end of tube 44 a diameter of 0.029 inch, tube 47 an internal diameter of 0.041 inch, and the injector tube outlet 65 an internal diameter of 0.029 inch. Although not critical, opening 66 in tube 63 ($\frac{1}{16}$ inch diameter) may be about 0.052 inch. Tube 49 may be of sufficient size to freely vent air into the supply chamber.

It will be understood that the drawings are to be regarded merely as typical and illustrative of the invention in one of its preferred forms, and that various changes and modifications may be made without departure from the invention in its intended spirit and scope.

I claim:

1. In an engine lubricator of the character described, means forming a lubricant supply chamber, a discharge line through which lubricant is drawn by suction from said chamber to the engine as the engine is started, and a lubricant feed control including means for taking air into said chamber and said discharge line after removal of a quantity of lubricant from the chamber, whereby the supply of lubricant to said line is interrupted after operation of the engine over a predetermined period of time, and remains interrupted during continued operation of the engine at all speeds.

2. In an engine lubricator of the character described, means forming a lubricant supply chamber, a discharge line through which lubricant is drawn by suction from said chamber to the engine as the engine is started, a lubricant feed chamber having a restricted communication with said supply chamber, and means whereby lubricant is displaceable from the supply chamber into the feed chamber by suction applied to said discharge line.

3. In an engine lubricator of the character described, means forming a lubricant supply chamber, a discharge line through which lubricant is drawn by suction from said chamber to the engine as the engine is started, a lubricant feed chamber having a restricted communication with said supply chamber, a lubricant reservoir communicating with said feed chamber, and suction controlled means for taking lubricant from said reservoir into said feed chamber.

4. In an engine lubricator of the character described, a lubricant supply chamber having a suction connection through which lubricant is drawn from the chamber to the engine, and a lubricant feed chamber above said supply chamber and communicable therewith by way of a restricted passage through which lubricant flows by gravity into the supply chamber when the engine is stopped, and means for venting air through said chamber to the engine after withdrawal of a predetermined quantity of lubricant from said chamber.

5. In an engine lubricator of the character described, a container forming a lubricant supply reservoir, a lubricant supply chamber having a suction connection through which lubricant is drawn from the chamber to the engine, and a lubricant feed chamber above said supply chamber and communicable therewith by way of a restricted passage through which lubricant flows by gravity into the supply chamber when the engine is stopped, means whereby suction communicated to said supply chamber withdraws a predetermined amount of lubricant therefrom to the engine and displaces additional lubricant therefrom, and means for taking lubricant from said reservoir into said feed chamber.

6. In an engine lubricator of the character described, a container forming a lubricant supply reservoir, a lubricant supply chamber having a suction connection through which lubricant is drawn from the chamber to the engine, and a lubricant feed chamber above said supply chamber and communicable therewith by way of a restricted passage through which lubricant flows by gravity into the supply chamber when the engine is stopped, means whereby suction communicated to said supply chamber withdraws a predetermined amount of lubricant therefrom to the engine and displaces additional lubricant therefrom into said feed chamber, and means for taking lubricant from said reservoir into said feed chamber.

7. In an engine lubricator of the character described, a container forming a lubricant supply reservoir, a lubricant supply chamber within said container and communicable by a suction connection with the engine, a lubricant feed chamber above said supply chamber and communicable therewith by way of a restricted passage through which lubricant flows by gravity into the supply chamber during a predetermined period of time after displacement of lubricant from the supply chamber and after the engine is stopped, and means whereby suction communicated to said supply chamber withdraws a predetermined amount of lubricant therefrom to the engine and displaces additional lubricant therefrom into said feed chamber.

8. In an engine lubricator of the character described, means responsive to starting of the engine for supplying lubricant thereto during starting, and means rendering said supply means capable of delivering lubricant at the start of engine operation only after the engine has been stopped for an extended period of time, the last mentioned means including a timed lubricant feed control governing delivery of lubricant to the first mentioned means and preventing it from supplying any lubricant to the engine until after said extended period of time.

9. In an engine lubricator of the character described, suction operated means responsive to starting of the engine for supplying lubricant thereto during starting, and means rendering said supply means capable of delivering lubricant at the start of engine operation only after the engine has been stopped for an extended period of time, the last mentioned means including a timed lubricant feed control governing delivery of lubricant to the first mentioned means and preventing it from supplying any lubricant to the engine until after said extended period of time.

10. In an engine lubricator of the character described, means responsive to starting of the engine for supplying lubricant thereto during starting and only for a relatively short period thereafter, and means rendering said supply means capable of delivering lubricant at the start of engine operation only after the engine has been stopped for an extended period of time, the last mentioned means including a timed lubricant feed control governing delivery of lubricant to the first mentioned means and preventing it from supplying any lubricant to the engine until after said extended period of time.

11. In an engine lubricator of the character described, means responsive to starting of the engine for supplying a measurable predetermined quantity of lubricant thereto during starting, and means rendering said supply means capable of delivering lubricant at the start of engine operation only after the engine has been stopped for an extended period of time of at least about one hour, the last mentioned means including a timed lubricant feed control governing delivery of lubricant to the first mentioned means and preventing it from supplying any lubricant to the engine until after said extended period of time.

12. In an engine lubricator of the character described, suction operated means responsive to starting of the engine for supplying a measurable predetermined quantity of lubricant thereto during starting, and means rendering said supply means capable of delivering lubricant at the start of engine operation only after the engine has been stopped for an extended period of time of at least about one hour, the last mentioned means including a timed lubricant feed control governing delivery of lubricant to the first mentioned means and preventing it from supplying any lubricant to the engine until after said extended period of time.

13. In an engine lubricator of the character described, means forming a lubricant supply chamber, a discharge line through which lubricant is drawn by suction from said chamber to the engine as the engine is started, and means whereby only a predetermined portion of the lubricant contained in said chamber is supplied to the discharge line from said chamber after the engine is started into operation, the last mentioned means including a timed lubricant feed control governing delivery of lubricant to the first mentioned means and preventing it from supplying any lubricant to the engine until after said extended period of time.

14. In an engine lubricator of the character described, means forming a lubricant supply chamber, a discharge line through which lubricant is drawn by suction from said chamber to the engine as the engine is started, means for admixing air with the lubricant taken to the engine through the discharge line, and a lubricant feed control including means for feeding lubricant to said chamber when the engine is stopped, and means for admitting air to the chamber and said discharge line after the engine is started and only after removal of a predetermined quantity of lubricant from the chamber, whereby the supply of lubricant to said line is interrupted after operation of the engine over a predetermined period of time, and remains interrupted during continued operation of the engine at all speeds.

15. In an engine lubricator of the character described, means forming a lubricant supply chamber, an outlet through which a charge of lubricant is drawn by suction from said chamber to the engine as the engine is started, and means operable only when the engine is stopped for feeding a successive charge of lubricant to said supply chamber, the last mentioned means comprising a lubricant containing feed chamber communicable with the supply chamber and means communicating suction to said feed chamber to prevent lubricant from flowing to the supply chamber from the feed chamber while the engine is operating.

16. In an engine lubricator of the character described, means responsive to starting of the engine for supplying lubricant thereto during starting, and means for feeding lubricant to said supply means at a delayed time such that the lubricant can be delivered to the engine only after the engine has been stopped for a predetermined and extended period of time, the last mentioned means comprising a lubricant containing feed chamber communicable with the supply chamber and means communicating suction to said feed chamber to prevent lubricant from flowing to the supply chamber from the feed chamber while the engine is operating.

17. In an engine lubricator of the character described, means forming a lubricant supply chamber, a discharge line through which lubricant is drawn by suction from said chamber to the engine as the engine is started, a lubricant feed chamber having a restricted communication with said supply chamber, a lubricant reservoir communicating with said feed chamber, and suction operated means for elevating lubricant from said reservoir to the feed chamber.

18. In an engine lubricator of the character described, a lubricant supply chamber having a suction connection through which lubricant is drawn from the chamber to the engine, a lubricant feed chamber above said supply chamber and communicable therewith by way of a restricted passage through which lubricant flows by gravity and at a predetermined rate into the supply chamber when the engine is stopped, and means preventing lubricant from flowing to the supply chamber from said feed chamber while the engine is operating.

19. In a lubricator of the character described, means forming a lubricant supply chamber, a lubricant feed source communicable with said supply chamber, and a discharge conduit through which lubricant is drawn from said chamber, said conduit having an inlet positioned at a predetermined intermediate depth in said chamber so that only lubricant above that depth is withdrawn through said conduit, means for aerating the lubricant after its withdrawal from the chamber through said conduit, and means for interrupting the discharge of lubricant from the chamber to said conduit by admitting air to said chamber and thence to the discharge conduit when the lubricant level in the chamber is depressed below said depth.

20. In a lubricator of the character described, means forming a lubricant supply chamber, a lubricant feed source communicable with said supply chamber, and a discharge conduit through which lubricant is drawn from said chamber, said conduit having an inlet positioned at a predetermined intermediate depth in said chamber so that only lubricant above that depth is withdrawn through said conduit, means for admitting air to said chamber and thence to the discharge conduit when the lubricant level in the chamber is depressed below said depth, and suction operated means for returning lubricant remaining in the chamber below said depth to said supply source.

21. In a lubricator of the character described, means forming a lubricant supply chamber, a lubricant feed source communicable with said supply chamber, and a discharge conduit through which lubricant is drawn from said chamber, said conduit having an inlet positioned at a predetermined intermediate depth in said chamber so that only lubricant above that depth is withdrawn through said conduit, and suction operated means for returning lubricant remaining in the chamber below said depth to said supply source.

22. In an engine lubricator of the character described, a lubricant supply chamber, a discharge conduit through which lubricant is drawn from said chamber at a predetermined intermediate depth in the chamber so that only lubricant above that depth is withdrawn through said conduit, a lubricant feed chamber above said supply chamber and communicable therewith by way of a restricted passage opening into the supply chamber below said intermediate depth and through which lubricant flows by gravity into the supply chamber when the engine is stopped, means forming an opening through which air is admitted to the supply chamber, and a connection between said discharge conduit and the upper interior of said feed chamber whereby suction communicated to the feed chamber causes lubricant to be drawn from the supply chamber below said intermediate depth therein, upwardly through said restricted passage into the feed chamber.

23. In an engine lubricator of the character described, a lubricant supply chamber, a discharge conduit through which lubricant is drawn from said chamber at a predetermined intermediate depth in the chamber so that only lubricant above that depth is withdrawn through said conduit, a lubricant feed chamber above said supply chamber and communicable therewith by way of a restricted passage opening into the supply chamber below said intermediate depth and through which lubricant flows by gravity into the supply chamber when the engine is stopped, means forming an opening through which air is admitted to the supply chamber, a connection between said discharge conduit and the upper interior of said feed chamber whereby suction communicated to the feed chamber causes lubricant to be drawn from the supply chamber below said intermediate depth therein, upwardly through said restricted passage into the feed chamber, a lubricant reservoir containing said chambers, and means operated by suction communicated through said discharge conduit, for supplying lubricant from the reservoir to said feed chamber.

EMMET M. GREEN.